United States Patent
Westberg

(10) Patent No.: US 6,791,982 B2
(45) Date of Patent: Sep. 14, 2004

(54) SEGMENTATION PROTOCOL THAT SUPPORTS COMPRESSED SEGMENTATION HEADERS

(75) Inventor: Lars Westberg, Enköping (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/407,959

(22) Filed: Sep. 29, 1999

(65) Prior Publication Data

US 2003/0198226 A1 Oct. 23, 2003

(51) Int. Cl.[7] ............................................. H04L 12/56
(52) U.S. Cl. ................... 370/392; 370/394; 370/401; 370/474
(58) Field of Search ................... 370/389, 392, 370/394, 400, 401, 473, 474, 464, 465, 471

(56) References Cited

U.S. PATENT DOCUMENTS

| | | | |
|---|---|---|---|
| 5,095,480 A | * | 3/1992 | Fenner ........................ 370/238 |
| 5,293,379 A | | 3/1994 | Carr |
| 5,307,413 A | | 4/1994 | Denzer |
| 5,351,237 A | | 9/1994 | Shinohara et al. |
| 5,430,727 A | | 7/1995 | Callon |
| 5,521,940 A | | 5/1996 | Lane et al. |
| 5,535,199 A | | 7/1996 | Amri et al. |
| 5,583,859 A | | 12/1996 | Feldmeier |
| 5,627,829 A | | 5/1997 | Gleeson et al. |
| 5,657,452 A | | 8/1997 | Kralowetz et al. |
| 5,757,452 A | | 5/1998 | Masaki et al. |
| 5,826,032 A | | 10/1998 | Finn et al. |
| 5,841,764 A | | 11/1998 | Roderique et al. |
| 5,850,526 A | | 12/1998 | Chou |
| 6,041,054 A | * | 3/2000 | Westberg ..................... 370/389 |
| 6,243,667 B1 | * | 6/2001 | Kerr et al. ..................... 703/27 |
| 6,310,892 B1 | * | 10/2001 | Olkin ......................... 370/473 |
| 6,314,095 B1 | * | 11/2001 | Loa ............................ 370/352 |
| 6,385,199 B2 | * | 5/2002 | Yoshimura et al. ......... 370/393 |

OTHER PUBLICATIONS

IBM Technical Disclosure Bulletin: "Better Receive Buffer Utilization Using Internet Protocol Fragmentation", Nov. 1995, vol. 38, No. 11, pp. 369–370.
IBM Technical Disclosure Bulletin: "Session Header Compression Scheme Using Differential Run–Length Encoding", Dec. 1997, vol. 40, No. 12, pp. 125–126.
IBM Technical Disclosure Bulletin: "Buffer Management Scheme for Gigabit IP Routers", Feb. 1993, vol. 36, No. 2, pp. 67–69.
S. Casner et al., "Compressing IP/UDP/RTP Headers for Low–Speed Serial Links", Feb. 1999.
Sklower et al., "The PPP Multilink Protocol (MP)", Aug. 1996.

* cited by examiner

Primary Examiner—Chau Nguyen
Assistant Examiner—Soon-Dong Hyun

(57) ABSTRACT

The per-node delay for transfer of a datagram that is segmented into datagram segments is reduced by a header compression based segmentation and link layer switching. For each datagram segment, the segmentation header includes a unique segmentation context identifier (CID). Based on the segmentation CID, the datagram segments are forwarded between intervening nodes of source and destination, without being reassembled at each node. The segmented data gram is reassembled at the destination node based on sequence numbers assigned to the datagram segments during segmentation.

12 Claims, 4 Drawing Sheets

SEGMENTATION PROTOCOL THAT SUPPORTS COMPRESSED SEGMENTATION HEADERS

TECHNICAL FIELD

The present invention relates to data communication over a network, more particularly to a segmentation method used for transmission of large data packets.

BACKGROUND

Recent advances in hardware and communication technologies have introduced the era of mobile computing over wired and wireless links. The proliferation of powerful notebook computers and wireless communications promises to provide users with network access at any time and in any location over the Internet. This continuous connectivity will allow users to be quickly notified of changing events and provide them with the resources necessary to respond to them even when in transit.

In mobile networks, such as that proposed by Internet Engineering Task Force (IETF), a mobile host is allowed to roam freely on the Internet while still maintaining the same IP address. In such systems, data transfer delay requirements are critical and transmissions must support efficient transport. These requirements are even more critical for real-time applications, such as voice or video. The Internet community has a well-developed and mature set of layered transport and network protocols, which are quite successful in offering to end-users both connection-oriented transport protocols, such as Transport Control Protocol (TCP), and connectionless transport protocols, such as User Datagram Protocol (UDP), over connectionless network services, such as Internet Protocol (IP). Many popular network applications have been built directly on top of the TCP and UDP over the past decade. These have helped these Internet services and protocols to become widely-spread de facto standards.

Interconnection layer protocols and interfaces there between are defined to provide specifications for communication between a process or program being executed on one host computer's operating system and another process or program running on another computer. Transmission control protocol/internet protocol (TCP/IP) are two protocols that are part of a protocol suite or family of protocols layered and designed to connect computer systems that use different operating systems and network technologies.

FIG. 1(a) illustrates conceptual layers for TCP/IP as well as the format of objects passed between adjacent protocol layers. TCP/IP is a four layer protocol suite (the hardware layer is not counted) which facilitates interconnection on the same or different networks, and in certain networks such as the Internet, is a requirement for interoperability. TCP, which is a transport layer protocol, is used to access applications on other hosts, and IP permits identification of source and destination addresses for communication between hosts on the same or different networks. The fundamental internetwork service consists of a packet delivery system, and the internetwork protocol (IP) defines that delivery mechanism, i.e., the basic unit of data transfer.

The basic data transfer unit is often called a "datagram" as is well known in the art and is divided into header and data areas, as shown in FIG. 1(b). The header contains source and destination addresses and a type field that identifies the contents of the datagram. For example, a UDP header consists of a UDP source port and UDP destination port. A UDP message length field indicates the number of octets in a UDP datagram, and a UDP check sum provides an optional checksum of UDP and some parts of the IP header. The IP protocol only specifies the header format including the source and destination IP addresses; it does not specify the format of the data area.

The IP protocol also performs a routing function by choosing a path over which data will be sent. Using special procedure called routing protocols, routers exchange information among themselves and the hosts to which they are connected. This allows them to build tables, called routing tables, which are used to select a path for any given packet from a source to a destination. Although there can be more than one router along the path, each router makes only an individual forwarding decision as to which is the next host or router, i.e., the next network hop. This method is called hop-by-hop routing and is distinguished from end-to-end protocol that is implemented at transport through application layers.

Forwarding decisions at each node are based on fields within the IP header and based on entries in the nodes's IP routing table. FIG. 1(c) illustrates a standard IP header which consists of a number of predefined fields. Some of the fields in IP header remain constant throughout the path between the source and destination. For example, fields SOURCE IP ADDRESS and DESTINATION IP ADDRESS, which, in IPv4, contain the thirty-two bit IP addresses of the datagram sender and intended recipient, remain unchanged throughout the path. As each node makes its forwarding decision, other IP header fields, may change according to a constant parameter, for example, sequentially, or they may change in a more unpredictable way.

In order to carry data that has real-time properties, a protocol known as Real-time Transport Protocol (RTP) is defined for providing end-to-end delivery services, such as interactive audio and video, with a growing interest in using RTP as one step to achieve interoperability among different implementations of network audio/video applications. The delivery services include payload type identification, sequence numbering, time stamping and delivery monitoring. Although RTP may be used with a number of suitable underlying network or transport protocols, such as TCP, applications typically run RTP on top of UDP to make use of its multiplexing and checksum services, with both RTP and UDP protocols contributing parts of the transport protocol functionality. For Internet environment, of course, the underlying network service or layer for such session and transport layers is the IP.

As stated above, over end-to-end connections, each of the RTP, UDP, or IP has an overhead associated with corresponding headers, with header overhead for RTP, UDP, and IPv4 being 12 bytes, 8 bytes and 20 bytes, respectively, for a total of 40 bytes of combined header overhead. Occasionally, this 40-byte combined overhead is larger than the actual payload itself. Because a large transmission bandwidth is required to accommodate such a large overhead, especially over low speed lines, such as dial-up modems at 14.4 or 28.8 kb/s, a header compression technique has been proposed as an IETF Standard Protocol by Casener et al. titled "Compressing IP/UDP/RTP Headers for Low-Speed Serial Links," February 1999. This document is identified by IETF as Request for Comment 2508 (hereinafter referred to as RFC 2508) and is hereby incorporated by reference. Similar to TCP header compression, the proposed IP/UDP/RTP header compression in RFC 2508 relies partly on the assumption that some of the bytes in headers remain constant over the life of the connection. Moreover, differential coding on changing header fields is used to reduce their size and to eliminate the changing fields entirely for common cases by calculating the changes from a previous packet length, as indicated by the underlying link-level protocol.

The header compression of RFC 2508 offers a reduction in the combined compression of IP, UDP and RTP headers to two bytes for packets when UDP checksums is not sent, or four bytes when UDP checksums is sent. Although the proposed compression may be applied to the RTP header alone on an end-to-end basis, the compression of the combination of IP, UDP and RTP headers on a link-by-link basis is preferred because the resulting header overhead is approximately the same (2–4 bytes) in either case, and because compressing on a link-by-link basis provides better performance due to lower delay and loss rate.

The use of IP/UDP/RTP compression over a particular link is a function of the link-layer protocol, which defines negotiation rules for reliable transfer of data packets between two nodes. One known link layer protocol is the Point-to-Point Protocol (PPP) which provides a standard method for transporting multi-protocol datagrams over point-to-point links. PPP is comprised of three main components: a method for encapsulating multi-protocol datagrams, a Link Control Protocol (LCP) for establishing, configuring, and testing the data-link connection, and a family of Network Control Protocols (NCPs) for establishing and configuring different network-layer protocols.

In an IETF proposed protocol identified as RFC 1990 by Sklower et al., titled "The PPP Multilink Protocol (MP)," August 1996 (hereinafter referred to as RFC 1990), which is hereby incorporated by reference, a multilink protocol is disclosed that based on an LCP option negotiation permits a system to indicate to its peer that it is capable of combining multiple physical links into a "bundle." The system offering the option is capable of combining multiple independent links between a fixed pair of systems, providing a virtual link with greater bandwidth than any of the constituent members.

More specifically, the multilink operation disclosed in RFC 1990 is modeled as a virtual PPP link-layer entity wherein packets received over different physical link-layer entities are identified as belonging to a separate PPP network protocol, the Multi-link Protocol. The packets are recombined and sequenced according to information present in a Multilink header. Under the Multilink Protocol of RFC 1990, the PPP multilink fragments are encapsulated using a protocol identifier. Following the protocol identifier is a two or four byte header containing a sequence number, and two one bit fields indicating that the fragment begins a packet or terminates a packet. Using the Multilink header, the system can then receive upper layer protocol data units (PDU) in a fragmented form, reassemble the fragments back into the original PDU for processing. All packets received over the links identified as belonging to the Multilink arrangement are presented to the same network-layer protocol processing unit, whether they have the Multilink headers or not.

In IP networks, a packet size may become quiet large. According to RFC 2508, a segmentation scheme over the link layer may be used in conjunction with the proposed header compression to allow small, real-time packets to interrupt large, presumably non-real-time packets in order to reduce delay, particularly for providing interactive services, for example, audio services, where minimizing the end-to-end delay is critical. Without giving specific details, RFC 2508 propose segmentation to be handled by a separate layer. However, RFC 2508 requires the implementation of segmentation and compression to be performed in such a way that the compression could be used by itself in situations where segmentation is necessary. Under this arrangement, the compression scheme of RFC 2508 is to be applied locally on the two ends of a link independent of any other mechanisms, except for the requirements that the link layer provides packet type codes, a packet length indication, and error detection. However, supporting segmentation by a separate network layer adds to the complexity and overhead of the system.

Conventionally, when IP headers are not compressed, the data packets are forwarded without being reassembled at each node. However, when compressed header format is used, the data packets need to be reassembled at each node in order to retrieve destination information for correctly forwarding the data packets along to the next node. In some IP networks that have a limited physical link bandwidth, for example, those in a cellular access network that use radio frequency channels, the per hop delay imposed by large packets could become significant, if data packets are reassembled at each node. If the number of nodes (i.e., hops or routers) within the network is also large, the aggregated delay caused by large packets may become significantly large as well. With limited physical link bandwidth, the large per-node delay may significantly degrade offering real-time audio and video services. Therefore, there exists a need for a segmentation scheme that reduces per-node delay due to large packets without adding undue complexity and system overhead.

SUMMARY OF THE INVENTION

The present invention reduces per-node delay by assembling datagram segments at the destination, as opposed to at each intervening node along the path from the source to the destination. As such, each node quickly forwards a received datagram segments without reassembly. Once at the destination, the datagram segments are reassembled, instead of being reassembled multiple times at the intervening nodes.

Briefly, according to the invention, a data packet is communicated between a source node and a destination node having a destination address by being segmented into a plurality of datagram segments such that each datagram segment has a corresponding header. The datagram segments are forwarded through the intervening nodes between the source and destination nodes, based on unique segmentation context identification (CID) values inserted at headers of each of the datagram segments as the datagram segments are forwarded through the intervening nodes. Under the present invention, an inserted CID value at an intervening node correlates the destination address with a corresponding output port address, until the datagram segments are received at the destination node. The datagram segments are then reassembled at the destination node, without being reassembled at each intervening node. Preferably, sequence information are inserted into the headers of each datagram segment at the source node to be reassembled at the destination node, based on the sequence information.

According to another aspect, a data packet having a header and an associated data portion is segmented into a plurality of datagram segments which are transferred in accordance with a header compression and link layer switching technique of the invention. Each datagram segment has a corresponding header and data portion. The header has one of two formats: a full header and a compressed header. Both header formats include a unique CID value. In addition to CID value, the full header format also including at least one IP address. The compressed header may also include information corresponding to header fields that change according to a constant parameter or those that change unpredictably.

Under the present invention, the link layer switching is based on the CID value. Instead of forwarding datagram segments based on the IP address, they are forwarded based on the CID value. In this way, the segmentation technique of the present invention allows the datagram segments to be communicated over the nodes without being reassembled at each node. As stated above, the datagram segments are reassembled at the destination node.

According to some of the more detailed features of the invention, when a datagram segment is received, a determination is made as to whether the received header has a full or compressed format. If it has a full format, a routing table is analyzed to identify an outgoing port that corresponds to the IP address received with the full header. The identified outgoing port number and the incoming CID value are stored in a CID table. The received datagram segment is then forwarded on the outgoing port with a compressed header that has an outgoing CID value that replaces the incoming CID value. If the received header is compressed, its incoming CID value is analyzed based on the CID table. The corresponding datagram segment is forwarded on an output port that corresponds to the incoming CID value. Before being forwarded, the incoming CID value in the compressed header is replaced by an outgoing CID value corresponding to the output port.

DETAILED DESCRIPTION OF THE INVENTION

Figure 1A:
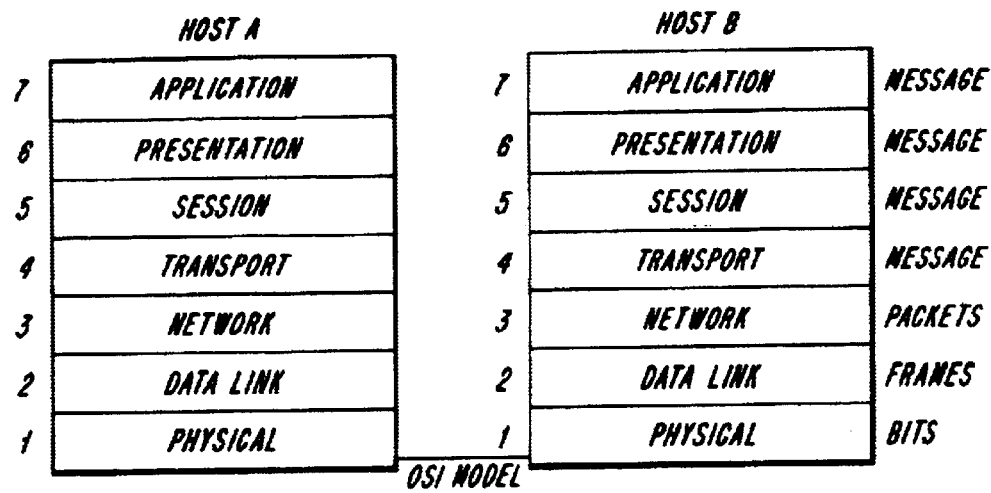
FIGS. 1(a), 1(b), 1(c) are diagrams showing Internet model layers, a datagram, and an IPv4 header, respectively.
Figure 1B:
Figure 1C:
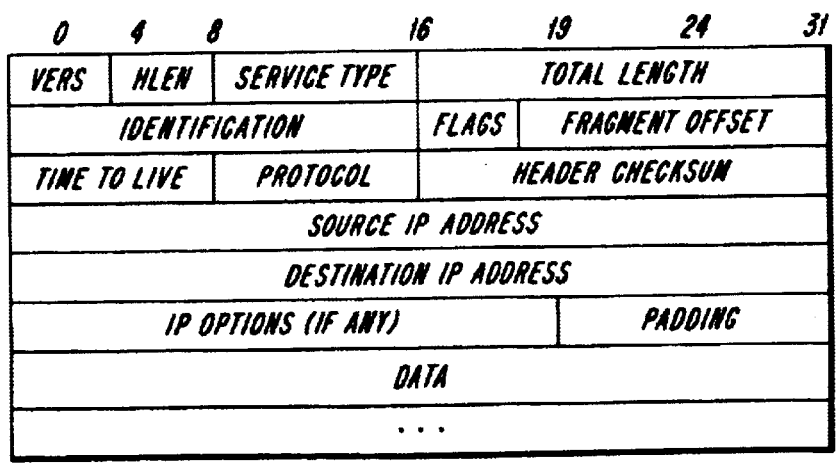
Figure 2A:
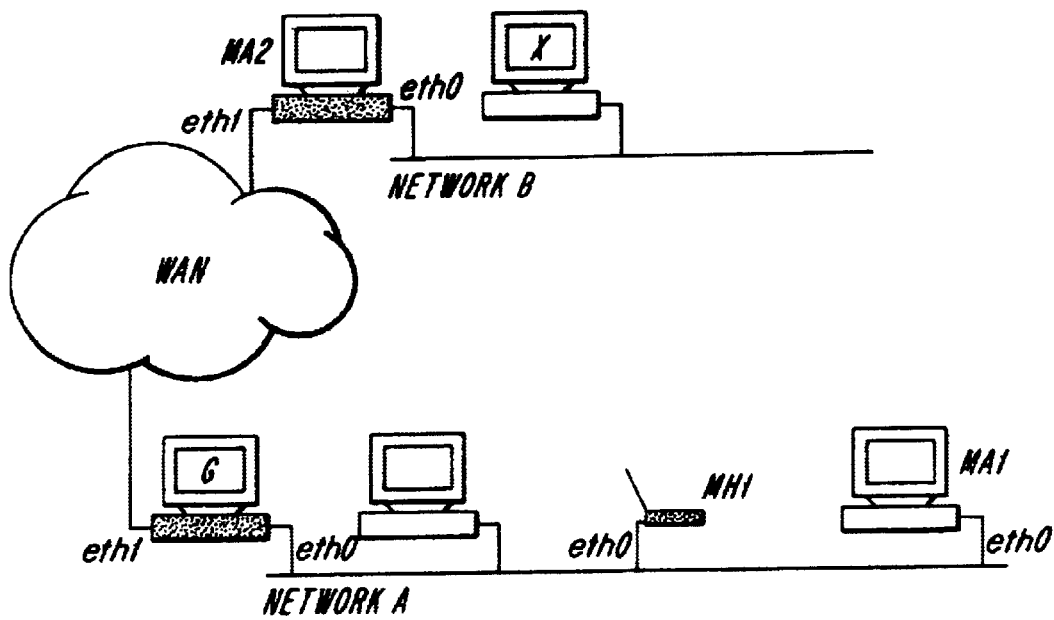
FIGS. 2(a) and 2(b) are block diagrams of mobile supporting inter-networks systems incorporating the segmentation method of the present invention.
Figure 2B:
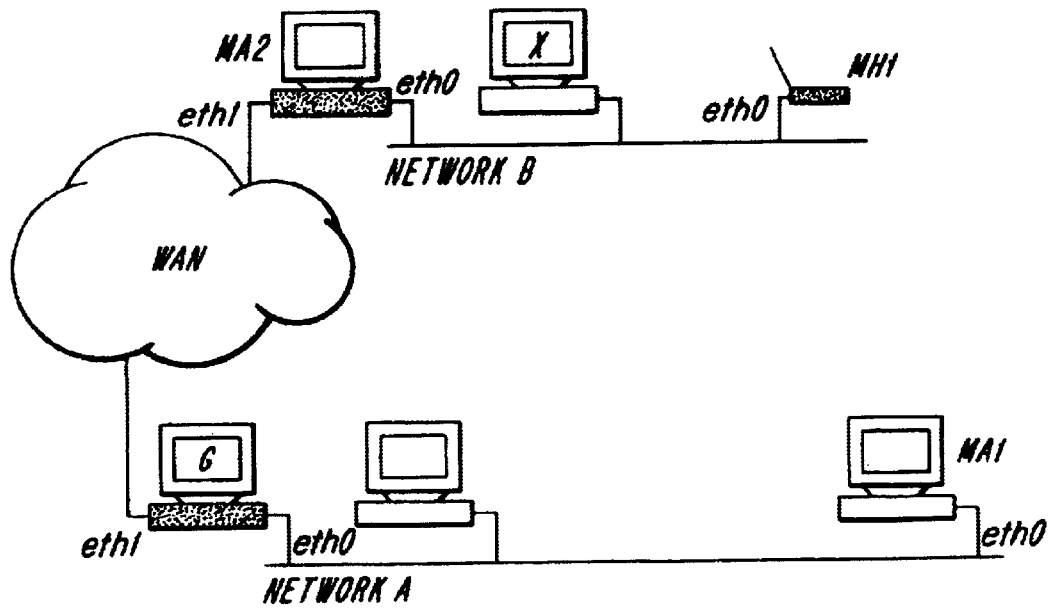

Referring to FIGS. 2(a) and 2(b) diagrams showing mobility-supporting inter-networks that advantageously incorporates a segmentation technique according to the present invention. It should be noted that although the instant specification is described with reference to mobility supporting inter-networks, the present invention may be utilized in a wide variety of wide area and local area networks (WANS and LANS) that support wired and wireless connection based or connection-less environments.

As stated above, the Internet Engineering Task Force (IETF) is currently developing Mobile-IP standards, which defines special entities called the Home Agent (HA) and Foreign Agent (FA) which cooperate to allow a Mobile Host (MH) to move without changing its IP address. These standards include Mobile-IP versions 4 and 6. Although the present invention is described in terms of the IP version 4, one skilled in the art would appreciate the applicability of the invention to all other versions that may be developed at the present time and in the future, including IP version 6. The term mobility agent is used to refer to a computer acting as either a Home Agent, Foreign Agent, or both. A network is described as having mobility support if it is equipped with a mobility agent.

Each MH is associated with a unique home network as indicated by its permanent IP address. Normal IP routing always delivers packets meant for the MH to this network. When a MH is away, a specially designated computer on this network, its Home Agent, is responsible for intercepting and forwarding its packets. The MH uses a special registration protocol to keep its HA informed about its current location. Whenever a MH moves from its home network to a foreign network, or from one foreign network to another, it chooses a Foreign Agent on the new network and uses it to forward a registration message to its HA.

After a successful registration, packets arriving for the MH on its home network are encapsulated by its HA and sent to its FA. Encapsulation refers to the process of enclosing the original datagram as data inside another datagram with a new IP header. This is similar to the post office affixing a new address label over an older label when forwarding mail for a recipient who has moved. The source and destination address fields in the outer header correspond to the HA and FA, respectively. This mechanism is also called tunneling since intermediate routers remain oblivious of the original inner IP header. In the absence of this encapsulation, intermediate routers will simply return packets back to the home network. On receiving the encapsulated datagram, the FA strips off the outer header and delivers the newly exposed datagram to the appropriate visiting MH on its local network.

The inter-networks include two mobility supporting networks, Network A and Network B, which are equipped with mobility agents MA1 and MA2, respectively. A mobile host, MH1, is also shown, whose home network is Network A. FIG. 2(a) shows MH1 being connected to its home networks Network A. Whenever MH1 is away, MA1 acts as its home agent. As shown in FIG. 2(b), when MH1 visits Network B, MA2 acts as its foreign agent. It is worth pointing out that changes introduced by Mobile-IP are independent of the communication medium in use. Even though FIGS. 2(a) and 2(b) show mobility support in a wired internetwork, the Mobile-IP works just as effectively in a wireless environment.

In the exemplary embodiment of the invention, a datagram is communicated over a connection that is established using the RTP/UDP/IP protocol, over a suitable link layer protocol, such as PPP. However, connections supporting various others networking protocols, such as TCP/IP, may also utilize the segmentation method of the present invention. Preferably, the present invention uses a header compression technique in which the header overhead reduction comes from the observation that although several fields change in every packet, the difference from packet to packet is often constant and therefore the second-order difference is zero. By maintaining both the uncompressed header and the first-order differences in a session state shared between a compressor and a decompressor, all that must be communicated is an indication that the second-order difference is zero. In that case, the decompressor can reconstruct the original header without any loss of information simply by adding the first-order differences to the saved uncompressed header as each compressed packet is received.

For multiple simultaneous connections, the IP/UDP/RTP compression technique disclosed in RFC 2508 maintains a corresponding state for each of the multiple session contexts. In RFC 2508, a session context is defined by the combination of the IP source and destination addresses, the UDP source and destination ports, and the RTP SSRC field. The compressed packet carries a small integer, called the session context identifier or CID, to indicate in which session context that packet should be interpreted. The decompressor can use the CID to index its table of stored session contexts directly. Under this arrangement, the compression protocol maintains a collection of shared information in a consistent state between the compressor and decompressor.

Therefore, there is a separate session context for each IP/UDP/RTP packet stream, as defined by a particular combination of the IP source and destination addresses, UDP source and destination ports, and the RTP SSRC field. Both uncompressed and compressed packets carry the CID and a sequence number used to detect packet loss between the compressor and decompressor. Each context has its own separate sequence number space so that a single packet loss need only invalidate one context.

Figure 3:
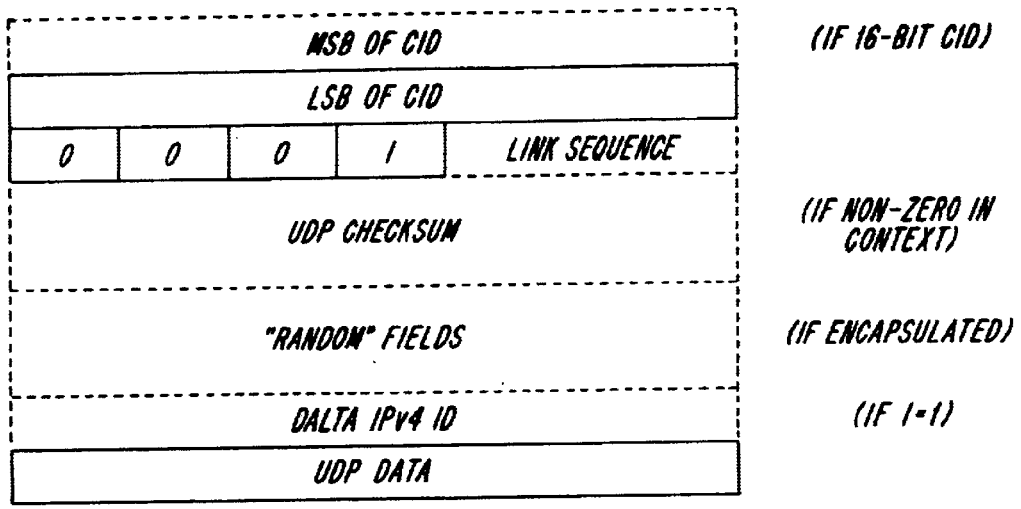
FIG. 3 is a diagram showing a compressed header format used for establishing connections in the systems of FIGS. 2(a) and 2(b).

In order to communicate packets in the various uncompressed and compressed forms, the protocol of RFC 2508 depends upon the link layer being able to provide an indication of various packet types in addition to the normal IPv4 and IPv6 packet formats. These packet formats include a full header and two compressed header formats. The full header format communicates the uncompressed IP header plus any following headers and data to establish the uncompressed header state in the decompressor for a particular context. When a full header packet is received, the complete set of headers is stored into the context indicated by the CID. The sequence number is also stored in the context, thereby resynchronizing the decompressor to the compressor. FIG. 3 shows the diagram of a compressed header format identified as COMPRESSED_UDP format, with dotted lines indicating fields that are conditionally present.

As stated before, some applications may require the use of a segmentation layer to support segmentation of packets when large packets of data are communicated from one node to another. According to the standard proposed in RFC 2508, the CID byte may be shared with the segmentation layer, if such sharing is feasible and has been negotiated. Since the compressor may assign CID values arbitrarily, the value can be set to match a context identifier from the segmentation layer. As discussed above, the arrangement proposed by RFC 2508 may complicate the network without reducing the per-hop delay when a large datagram is segmented. The present invention specifically reduces per-node delay by avoiding reassembly of datagram segments at each node, until all of the datagram segments are received at the destination node.

According to the segmentation method of the present invention, segmentation is supported on a link-by-link basis, without using a segmentation layer as proposed by RFC 2508. Under the present invention, a datagram is segmented into a plurality of datagram segments, with each datagram segments having a header and a corresponding data portion. The headers includes CID values that uniquely identify an IP header. By adding the CID value, which identify the destination IP address, to each header, each datagram segment can be forwarded on the link layer, without assembly at each hop, thereby reducing per-node delay.

Since some links may deliver datagram segments out of sequence, a segmentation sequence counter is also added to the header, along with position information indicating the position of a datagram segment within the segmented datagram. For example, the segmentation header may include flags that correspond to the beginning and end of the datagram segments. More specifically, in the preferred embodiment of the invention, the synchronization rules of Multilink protocol set forth in the RFC 1990 are modified to provide the headers for the datagram segments. Therefore, in one embodiment, the segmentation protocol of the invention uses a segmentation CID value that indicates the beginning, the end, and a segmentation sequence number. The sequence number serves to provides information for reassembling the datagram segments of the same or different data packets at the destination.

Figure 4:
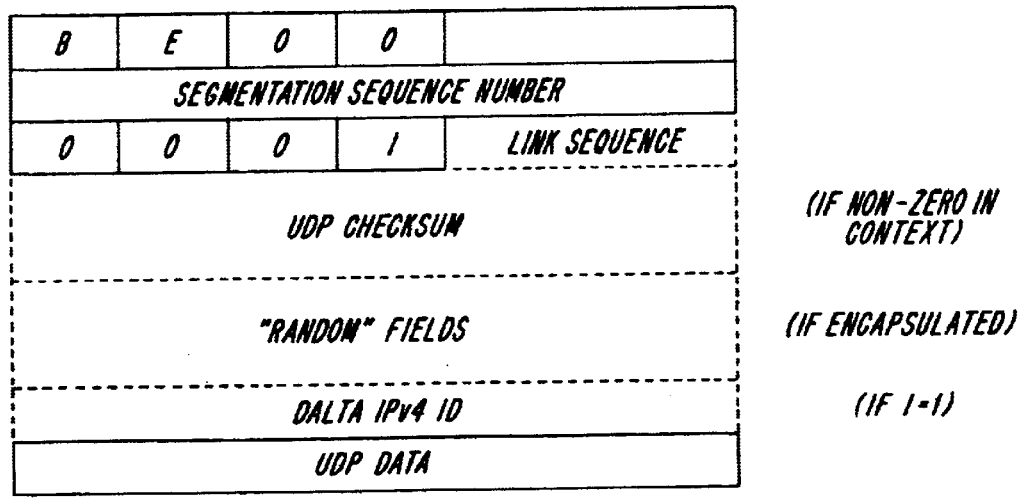
FIG. 4 is a diagram showing compressed segmentation header format according to an exemplary embodiment of the invention.
Figure 5:
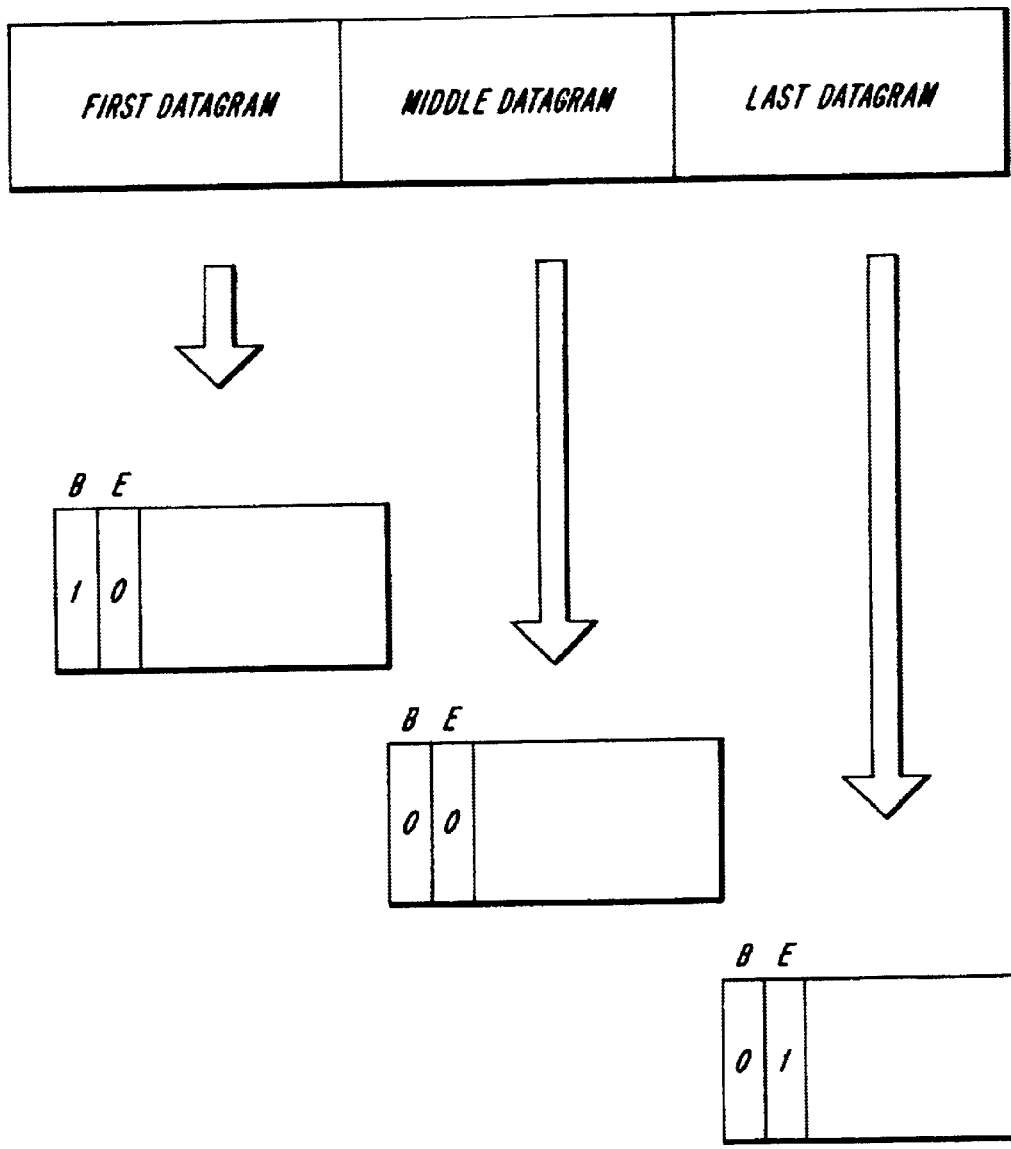
FIG. 5 is a diagram of exemplary datagram segments according to an exemplary embodiment of the invention.

FIG. 4 shows a diagram of an exemplary segmentation header format according to the invention. As shown, the (B)eginning fragment bit is a one bit field set to 1 for the first datagram segment and set to 0 for all other datagram segments. As shown in FIG. 5, the (E)nding fragment bit is a one bit field set to 1 on the last datagram segment and set to 0 for all other datagram segments. A segmentation header may have both the (B)eginning and (E)nding fragment bits set to 1, when a full datagram is contained within a segmentation packet. In an exemplary embodiment, the segmentation sequence field is a 12 bit number that is incremented for every datagram segment transmitted on each link belonging to the same segmented datagram. Between the (E)nding fragment bit and the sequence number is a reserved field, whose use is not currently defined, and is set to zero.

A node transmits the datagram segments with strictly increased segmentation sequence numbers, modulo the size of the sequence number field. In this way, a receiving node compares the sequence numbers, each of which uniquely identify a datagram segment for detecting lost segments. Under this segmentation protocol, a single reassembly structure is associated with the segmented datagram at the destination node.

According to the invention, the link layer switching is based on the CID value. Instead of forwarding a datagram or a datagram segment based on the IP-address, the technique of the invention forwards them based on the CID value. Each link-layer node (e.g. router) contains a number of output ports. The link-layer node stores routing tables that are associated with each one of the output ports. In one exemplary embodiment, the link layer switch contains two routing tables per port. A routing table that maps IP addresses to outport numbers, and a CID table that maps incoming segmentation CID values to outport numbers and outgoing CID values that are placed in the CID field of outgoing headers.

When a datagram or datagram segment arrives, a determination is made as to whether its header has a full format or a compressed format. If the header has a full format, the specified IP address is analyzed for determining its corresponding outgoing port. Once determined, the outgoing port and the corresponding segmentation CID value contained in the segmentation header are stored in the CID table. If a compressed header, having a format as shown in FIG. 4 is received, the incoming CID segmentation value is analyzed using the CID table to determine the corresponding outgoing port and outgoing segmentation CID value. Thereafter, the incoming CID value is replaced by the outgoing segmentation CID value and the datagram segment is then forwarded to the outgoing port.

Based on foregoing description, the method for communicating a data packet through intervening nodes between a source node and a destination node in accordance with the present invention divides the data packet into datagram segments and forward them through the intervening nodes, based on CID values inserted at a header of each of the datagram segments as the datagram segments are forwarded through the intervening nodes. The inserted CID value at an intervening node correlates the destination address with a corresponding output port address of the intervening node, until the datagram segments are received at the destination node. Finally, the datagram segments are reassembled at the destination node, without reassembly at each intervening node, preferably based on corresponding sequence information inserted at the headers of the datagram segments at the source node, when the data packet was segmented.

From the forgoing description it may be appreciated that the per-hop delay for transfer of datagram segments is reduced by the above described header compression based segmentation and link layer switching technique.

What is claimed is:

1. A method for communicating a plurality of datagram segments through intervening nodes between a source node and a destination node having a destination address comprising:

inserting sequence information at a header of each of said datagram segments at the source node;

forwarding the datagram segments through the intervening nodes, based on context identifier (CID) values inserted at the header of the datagram segments as the datagram segments are forwarded through the intervening nodes, wherein the inserted CID value at an intervening node correlates the destination address with a corresponding output port address of the intervening node, until the datagram segments are received at the destination node; and reassembling the datagram segments at the destination node, without reassembling at each intervening node wherein said reassembling is based on said sequence information received with each of said datagram segments.

2. In a data communications system where a data packet is segmented to into a plurality of datagram segments such that each datagram segment has a corresponding segmentation header, a method for communicating the datagram segments between at least two nodes using a link layer protocol comprising:

receiving a datagram segment;

determining whether a header of the received datagram has a compressed header or a full header;

analyzing an IP address received with the full header to identify a corresponding output port number and indexing the identified output port number with a segmentation CID value received with the full header;

analyzing an incoming segmentation CID value received with a compressed header to determine a corresponding output port number and replacing the incoming CID value by an outgoing CID value that corresponds to the determined output port number; and forwarding the datagram segment on an output port that corresponds to the determined output port number.

3. The method of claim 2 further including the step of reassembling the datagram segments at a destination node based on a segmentation sequence number.

4. In a data communications system where a datagram having headers and an associated data portion is communicated between at least two nodes using a link layer protocol, a method comprising:

segmenting the datagram into a plurality of datagram segments such that each datagram segment has a corresponding header and data portion;

inserting a unique segmentation context identification (CID) value in the segmentation header;

forwarding the datagram segments with the unique CID value from one node to another using the link layer protocol without reassembling the datagram segments at an intervening nodes between source and destination nodes wherein said step of forwarding at an intervening node further comprises the steps of:

receiving a datagram segment at said intervening node;

determining whether the header of the received datagram segment is full or compressed;

if full, indexing an incoming segmentation CID value with an outgoing port that corresponds to the IP address and forwarding the received datagram segment on the outgoing port with a compressed segmentation header that has a unique outgoing CID value;

if compressed, forwarding the received datagram segment on an output port that corresponds to an incoming CID value; and replacing the incoming CID value with an outgoing CID value that correspond to the output port in the segmentation header; and reassembling the datagram segments at the destination node based on a segmentation sequence number.

5. The method of claim 4 further including:

forwarding the first datagram segment of the segmented datagram using a full header that includes a corresponding CID value and an IP address; and forwarding subsequent datagram segments using a compressed header.

6. The method of claim 4, wherein the segmentation CID includes position information indicating the position of a datagram segment within the segmented datagram.

7. The method of claim 6, wherein the segmentation CID indicates whether a datagram segment is at the beginning of the segmented date message.

8. The method of claim 6, wherein the segmentation CID indicates whether a datagram segment is at the end of the segmented data message.

9. The method of claim 6, wherein the segmentation CID indicates that a datagram segment is not at the beginning or the end of the segmented data message.

10. The method of claim 1, wherein the segmentation information includes position information indicating the position of a datagram segment within an associated segmented datagram.

11. The method of claim 1, wherein the segmentation information indicates whether a datagram segment is at the beginning of an associated segmented datagram.

12. The method of claim 1, wherein the segmentation information indicates whether a datagram segment is at the end of an associated segmented datagram.

* * * * *